United States Patent [19]

Kato et al.

[11] Patent Number: 4,843,226
[45] Date of Patent: Jun. 27, 1989

[54] CARD-SHAPED INFORMATION STORAGE MEDIUM

[75] Inventors: Kaneyuki Kato; Kazufumi Teraji; Seiichi Nishino; Teruo Suzuki, all of Tokyo, Japan

[73] Assignee: NEC Corporation, Tokyo, Japan

[21] Appl. No.: 143,882

[22] Filed: Jan. 14, 1988

[30] Foreign Application Priority Data

Jan. 14, 1987 [JP] Japan .................................. 62-7801

[51] Int. Cl.$^4$ ............................................ G06K 19/06
[52] U.S. Cl. ..................................... 235/492; 235/487
[58] Field of Search ................................. 235/487, 492

[56] References Cited

U.S. PATENT DOCUMENTS 4,575,621 3/1986 Driefus ................................. 235/492

Primary Examiner—Harold I. Pitts
Attorney, Agent, or Firm—Sughrue, Mion, Zinn, Macpeak and Seas

[57] ABSTRACT

For protecting a semiconductor chips from an electric destruction due to electrostatic charges. A card-shaped information storage medium used for providing data information to an information processing unit comprising (a) a board member of an insulating material having an first occupation area for at least one semiconductor chip capable of preserving the data informations and a second occupation area for a plurality of communication terminals electrically coupled to the semiconductor chip, (b) a protective member covering the semiconductor chip and exposing the communication terminals to the outside thereof, and (c) a protective shutter movable into or out of the protective member for shifting a position of the information storage medium between a closed state and an open state. The communication terminals are covered with the protective shutter in the closed state, thereby preventing the communication terminals from a human body with the electrostatic charges.

13 Claims, 3 Drawing Sheets

CARD-SHAPED INFORMATION STORAGE MEDIUM

FIELD OF THE INVENTION

This invention relates to a card-shaped information storage medium and, more particularly, to a protective mechanism of a card-shaped information storage medium.

BACKGROUND OF THE INVENTION

Particular attention is being paid to card-shaped information storage mediums because of their handy shape and of their low production cost. The card-shaped information storage medium largely comprises a thin insulating board formed with conductive patterns, at least one semiconductor chip electrically connected to the conductive patterns and a protective film of a synthetic resin covering the thin insulating board and the semiconductor chip. The semiconductor chip usually provides an information storage of the read only memory type or the random access memory type and, in some applications, is associated with another semiconductor chip for the data information processing.

The card-shaped information storage medium thus arranged is inserted into a slot of an information processing unit and provides data informations to the information processing unit for operation. For this reason, the card-shaped information storage medium needs to have a plurality of communication terminals, and several examples of the communication terminals are disclosed in an article entitled "ELECTRONICS MANUFACTURES RUSHING INTO IC CARD MARKET", NIKKEI ELECTRONICS 1985. 12. 16, pages 249 to 262. This article describes that one of the problems encountered in the card-shaped information storage medium is an electric destruction due to electrostatic charges applied from a human body to the semiconductor chip through communication terminals. One of the solutions is to provide the communication terminals in cavities formed in the protective film as illustrated in FIG. 4 of the article. The communication terminals are not exposed to the outside, so that the electrostatic charges are hardly applied to the communication terminals. Another solution is also described in the article that magnetic coupling are used to communicate with the information processing unit as illustrated in FIG. 7 of the article.

However, a problem is encountered in the prior-art card-shaped information storage medium with communication terminals received in the cavities in that pins of the connector tend to be bent upon attachment to the communication terminals due to low hardness. This problem is serious if the number of pins is increased without increasing the occupation area. On the other hand, another problem is encountered in the prior-art card-shaped information storage medium in that the information storage medium is liable to be increased in size and production cost due to the magnetic coupling incorporated therein.

SUMMARY OF THE INVENTION

It is therefore an important object of the present invention to provide a card-shaped information storage medium which is free from the bending of the pins upon attachment.

It is also an important object of the present invention to provide a card-shaped information storage medium which has a protection mechanism capable of protecting the semiconductor chip or chips from the electrostatic charges at a relatively low cost.

To accomplish these objects, the present invention proposes to provide communication terminals formed on the board and covered with a movable shutter.

In accordance with the present invention, there is provided a card-shaped information storage medium used for providing data informations to an information processing unit comprising (a) a board member of an insulating material having an first occupation area for at least one semiconductor chip capable of preserving the data informations and a second occupation area for a plurality of communication terminals electrically coupled to the semiconductor chip, (b) a protective member covering the semiconductor chip and exposing the communication terminals to the outside thereof, and (c) a protective shutter movable into or out of the protective member for shifting a position of the information storage medium between a closed state and an open state, the communication terminals being covered with the protective shutter in the closed state, the communication terminals being exposed in the open state.

The card-shaped information storage medium may further comprise stopper member operative to limit the movement of the protective shutter when the protective shutter is moved out of the protective member and compression springs operative to urge the protective shutter to move for shifting the position of the information storage medium from the closed state to the open state.

In one implementation, the protective shutter has a conductive shutter plate capable of covering said communication terminals and a head member fixed to the conductive shutter plate and operative to come into contact with the stopper member when the information storage medium is shifted into the closed state. In another implementation, the stopper member is formed by a front portion of the protective member perpendicularly projecting from the second occupation area of the board member.

Additional electric component elements such as other semiconductor chips and a power supply may be mounted on the first occupation area, and conductive strips may be formed on said board member so as to interconnect said semiconductor chip and said communication terminals. It is preferable for the communication terminals to be formed by conductive strips on the board.

BRIEF DESCRIPTION OF THE DRAWINGS

The features and advantages of a card-shaped information storage medium according to the present invention will be more clearly understood from the following description taken in conjunction with the accompanying drawings in which.

DESCRIPTION OF THE PREFERRED EMBODIMENTS

First Embodiment

Figure 1:
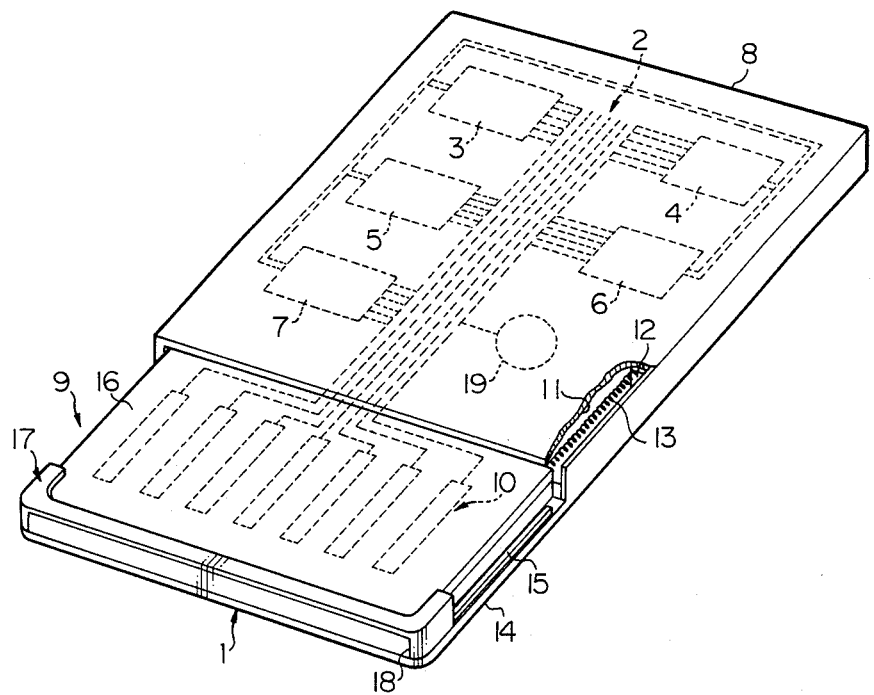
FIG. 1 is a perspective view showing the structure of a card-shaped information storage medium in a closed state according to the present invention.

Referring to FIG. 1 of the drawings, there is shown a card-shaped information storage medium embodying the present invention. The card-shaped information storage medium largely comprises a thin board 1 of an insulating material formed with a plurality of conductive strips 2, a plurality of semiconductor memory chips 3, 4, 5 and 6 mounted on the board 1 and electrically coupled to the conductive strips 2, a single chip microcomputer 7 mounted on the board 1 and electrically coupled to the conductive strips 2, a protective member 8 of a synthetic resin partially covering the board 1 where the chips 3 to 7 are mounted and a protective shutter 9 movable into or out of the protective insulation film 8 to expose or cover the remaining area of the board 1 where the communication terminals 10 are formed. In this instance, the thin board 1 is formed by a glass epoxy resin plate 1b with a thickness of 0.3 mm and is bonded to the protective member 8 with an adhesive material 1a. The protective member 8 is formed with a hollow space 11 open at the front end thereof, and the protective shutter 9 is partially inserted in the hollow space 11. The protective member 8 further has two stationary portions provided at both sides thereof and projecting into the hollow space 11, and two compression springs are fixed at one ends thereof to the stationary portions of the protective member 8, respectively. The compression springs are connected at other ends thereof to the rear end portion of the protective shutter 9. FIG. 1 shows only one stationary portion and, accordingly, only one compression spring which are designated by reference numerals 12 and 13, respectively. The protective member 8 further has protrusions extending along both sides of the remaining area of the board 1, and rail members are formed on the protrusions, respectively. FIG. 1 shows only one of the protrusions with the rail member, and reference numerals 14 and 15 designate the protrusion and the rail member, respectively.

The protective shutter 9 has a thin conductive shutter plate 16 capable of covering the remaining area of the board 1 and a head member 17 attached to the front end of the conductive shutter plate 16, and the conductive shutter plate 16 is perpendicularly spaced apart from the communication terminals 10. In this instance, the conductive shutter plate 16 is formed by a stainless steel plate 9a covered with an insulating sheet 9b. The head member 17 has a lower inner surface which forms a cutout 18, and the cutout 18 has a width approximately equal to the distance between the rail members. Moreover, both side portions of the head member 17 are thicker than the intermediate portion which in turn is thicker than the conductive shutter plate 16. The head member 17 is slidably mounted on the rail members, and, for this reason, the protective shutter 9 is moved into or out of the hollow space 11 under a guidance of the rail members. Reference numeral 19 designates a battery mounted on the board 1 and provides a current to the semiconductor memory chips 3 to 6 and the single chip microcomputer 7.

In operation, if no force is exerted on the head member 17 against the compression spring 13, the card-shaped information storage medium stays in the closed state. In the closed state, the protective shutter 9 is projected from the hollow space 11 until no further traveling of the protective shutter 9 is allowed the rail members are not allowed to travel by a certain stopper (not shown) formed on the rail members as illustrated in FIG. 1. In this situation, if a human body touches the conductive shutter plate 16, electrostatic charges flow from the body to the conductive shutter plate 16, however the communication terminals are isolated from the human body by combination of the protective shutter 9, the protective member 8 and the board member 1, so that no electric destruction takes place in the semiconductor memory chips 3 to 6, and the single chip microcomputer 7.

Figure 2:
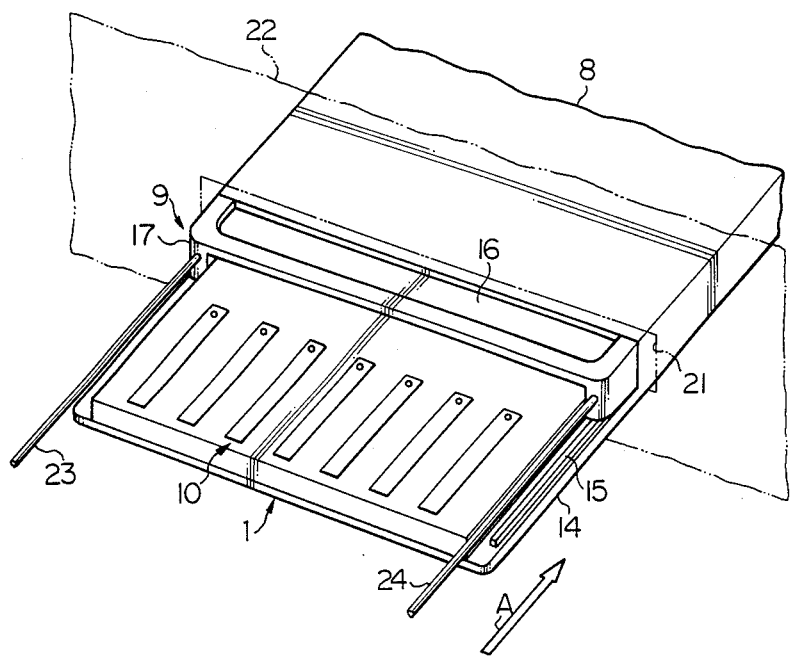
FIG. 2 is a perspective view showing the structure of the card-shaped information storage medium shown in FIG. 1 in a fully open state.

On the other hand, when the card-shaped information storage medium is inserted into a slot 21 formed in a front panel 22 of an information processing unit such as, for example, a computer unit, an electric typewriter or an NC machine, the head member 17 is brought into abutting engagement to a pair of pushers 23 and 24 incorporated in the information processing unit, and, then, moved in a direction indicated by allow A against the compression springs. Finally, the protective shutter 9 is moved into the hollow space 11 as illustrated in FIG. 2 of the drawings, and the card-shaped information storage medium is shifted into the open state. In this open state, the communication terminals 10 are electrically coupled to counterparts of the information processing unit, respectively, so that the semiconductor memory chips 3 to 6 provide data informations to the information processing unit and, on the contrary, preserve new data informations supplied from the information processing unit.

In this instance, the information processing unit has the two pushers 23 and 24 capable of attaching to both sides of the head member 17, however, another information processing unit may have a single pusher capable of attaching to the intermediate portion of the head member 17.

Second Embodiment

Figure 3:
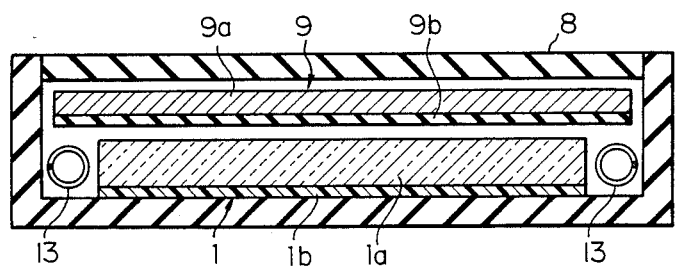
FIG. 3 is a cross-sectional view showing the internal structure of the card-shaped information storage medium shown in FIGS. 1 and 2.
Figure 4:
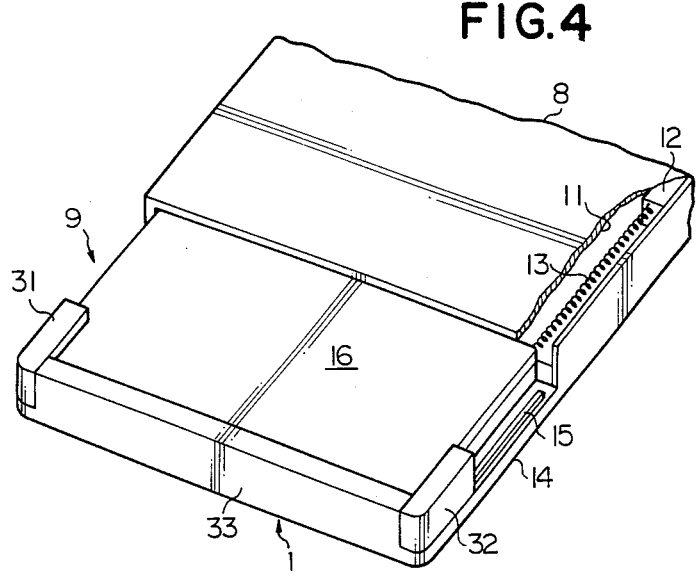
FIG. 4 is a perspective view showing the structure of another card-shaped information storage medium in a closed state according to the present invention.
Figure 5:
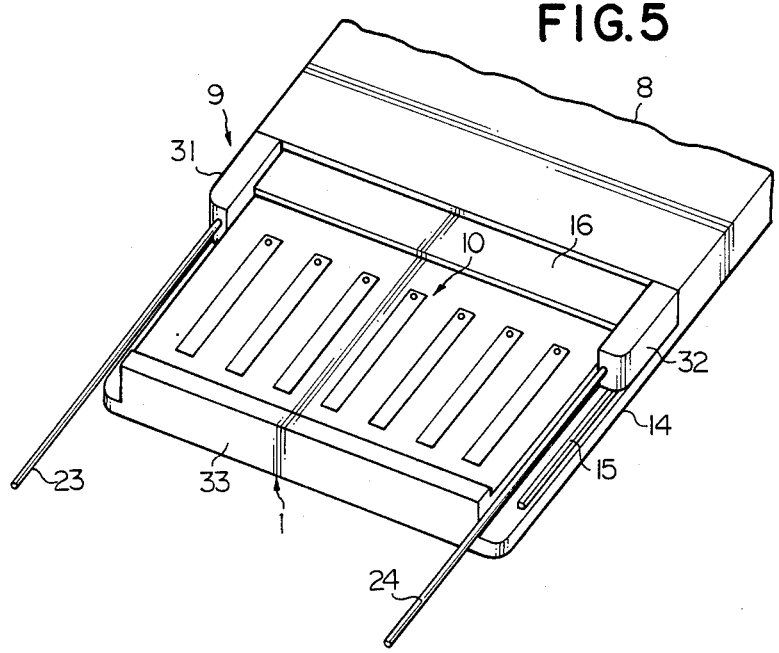
FIG. 5 is a perspective view showing the structure of the card-shaped information storage medium shown in FIG. 3 in a fully open state.

Turning to FIGS. 3 and 4 of the drawings, another card-shaped information storage medium is illustrated. The card-shaped information storage medium is similar in construction to the card-shaped information storage medium illustrated in FIGS. 1 and 2 except for head members 31 and 32 and a stopper 33 of a support member, so that the same reference numerals designating the members, the plate and the portions of the card-shaped information storage medium shown in FIGS. 1 and 2 are used to denote counterparts of the card-shaped information storage medium illustrated in FIGS. 3 and 4. The support member corresponds to the protective member of the card-shaped information storage medium illustrated in FIGS. 1, 2 and 3.

The head members 31 and 32 are attached to both sides of the front end portion of the conductive shutter plate 16, and the support member is formed with the stopper 33 projecting upwardly from the front end of the board member 1. The head member 31 and 32 are spaced apart from each other by a distance approximately equal to the width of the stopper 33, so that the stopper 33 is sandwiched between the head members 31 and 32 when the card-shaped information storage medium is in the closed state as illustrated in FIG. 3 of the drawings.

The card-shaped information storage medium thus constructed is shifted between the closed state and the open state illustrated in FIGS. 3 and 4, respectively. Namely, when the card-shaped information storage medium is free from an information processing unit, the protective shutter 9 projects from the hollow space 11 until the conductive shutter plate 16 comes into contact with the stopper 33, so that the communication terminals 10 are covered with the conductive shutter plate 16, thereby protecting the communication terminals and, accordingly, the semiconductor chips 3 to 7 from the electric destructions due to the electrostatic charges. Meanwhile, the card-shaped information storage medium is inserted into the slot of 21 of the front panel 22 of the information processing unit so as to provide data informations preserved therein, then the pushers 23 and 24 cause the protective shutter 9 to move into the hollow space 11 against the compression spring 13. This results in that the card-shaped information storage medium is entered into the open state. During the shift from the closed state to the open state, the terminals (not shown) of the information processing unit need to jump over the stopper 33 to contact with the communication terminals 10, and, for this reason, the communication terminals 10 are not scraped off by the slidable movements of the terminal of the information processing unit.

In the second embodiment described above, the stopper 33 limits the travel of the conductive shutter plate 16, so that the rail members do not expect to provide the limitation of the travel. This results in simplified construction of the rail members.

In another implementation, a single memory chip of either read only memory type or random access memory type may be incorporated therein together with or without the single chip microcomputer.

Although particular embodiment of the present invention have been shown and described, it will be obvious to those skilled in the art that various changes and modifications may be made without departing from the spirit and scope of the present invention.

What is claimed is:

1. A card-shaped information storage medium used for providing data informations to an information processing unit, comprising:
   (a) a board member of an insulating material having an first occupation area for at least one semiconductor chip capable of preserving said data informations and a second occupation area for a plurality of communication terminals electrically coupled to the semiconductor chip;
   (b) a protective member covering said semiconductor chip and exposing said communication terminals to the outside thereof; and
   (c) a protective shutter movable into or out of said protective member for shifting a position of said information storage medium between a closed state and an open state, said communication terminals being covered with said protective shutter in said closed state, said communication terminals being exposed in said open state.

2. A card-shaped information storage medium as set forth in claim 1, in which said information storage medium further comprises stopper means operative to limit the movement of said protective shutter when the protective shutter is moved out of said protective member.

3. A card-shaped information storage medium as set forth in claim 2, in which said information storage medium further comprises elastic means operative to urge said protective shutter to move for shifting the position of said information storage medium from said closed state to said open state.

4. A card-shaped information storage medium as set forth in claim 3, in which said elastic means are formed by compression springs.

5. A card-shaped information storage medium as set forth in claim 3, in which said protective shutter has a conductive shutter plate capable of covering said communication terminals and a head member fixed to the conductive shutter plate and operative to come into contact with said stopper means when the information storage medium is shifted into said closed state.

6. A card-shaped information storage medium as set forth in claim 2, in which said stopper means are formed by a front portion of said protective member perpendicularly projecting from said second occupation area of said board member.

7. A card-shaped information storage medium as set forth in claim 1, in which additional electric component elements are mounted on said first occupation area.

8. A card-shaped information storage medium as set forth in claim 7, in which said additional electric component elements include semiconductor memory chips.

9. A card-shaped information storage medium as set forth in claim 8, in which said additional electric component elements further includes a single chip microcomputer chip and a power source.

10. A card-shaped information storage medium as set forth in claim 1, in which conductive strips are formed on said board member so as to interconnect said semiconductor chip and said communication terminals.

11. A card-shaped information storage medium as set forth in claim 1, in which said communication terminals are formed by conductive strips on said second occupation area.

12. A card-shaped information storage medium used for providing data informations to an information processing unit, comprising:
   (a) a board member of an insulating material having an first occupation area for electric component elements including a plurality of semiconductor chips capable of preserving said data informations and a second occupation area for a plurality of communication terminals each formed by a conductive strip;
   (b) conductive strips interconnecting said electric component elements and said communication terminals;
   (c) a protective member covering said semiconductor chip and exposing said communication terminals to the outside thereof, said protective member having a pair of projections extending along both sides of said second occupation area, respectively, and mounting a pair of rail members, respectively; and
   (d) a protective shutter having a conductive shutter plate and a head member fixed to said conductive shutter plate and slidably mounted on said rail members, said protective shutter being movable into or out of said protective member for shifting a position of said information storage medium between a closed state and an open state, said communication terminals being covered with said conductive shutter plate in said closed state, said communication terminals being exposed in said open state.

13. A card-shaped information storage medium used for providing data informations to an information processing unit, comprising:
   (a) a board member of an insulating material having an first occupation area for electric component elements including a plurality of semiconductor chips capable of preserving said data informations and a second occupation area for a plurality of communication terminals each formed by a conductive strip;
   (b) conductive strips interconnecting said electric component elements and said communication terminals;
   (c) a protective member covering said semiconductor chip and exposing said communication terminals to the outside thereof, said protective member having a pair of projections extending along both sides of said second occupation area, respectively, and mounting a pair of rail members, respectively;
   (d) a protective shutter having a conductive shutter plate and a pair of head members fixed to both side portions of said conductive shutter plate and slidably mounted on said rail members, respectively, said protective shutter being movable into or out of said protective member under a guidance of said rail members for shifting a position of said information storage medium between a closed state and an open state, said communication terminals being covered with said conductive shutter plate in said closed state, said communication terminals being exposed in said open state; and
   (e) stopper means formed by a front end potion of said protective member perpendicularly projecting from said second occupation area of said board member and operative to come into contact with said conductive shutter plate when said information storage medium is shifted into said closed state.

* * * * *

UNITED STATES PATENT AND TRADEMARK OFFICE
CERTIFICATE OF CORRECTION

PATENT NO. : 4,843,226

DATED : June 27, 1989

INVENTOR(S) : K. Kato; K. Teraji; S. Nishino; T. Suzuki

It is certified that error appears in the above-identified patent and that said Letters Patent is hereby corrected as shown below:

On the title page, item [57] ABSTRACT, line 2, please delete "charges. A" and insert therefor --charges, there is disclosed a--.

Signed and Sealed this

Twenty-ninth Day of May, 1990

Attest:

HARRY F. MANBECK, JR.

*Attesting Officer*    *Commissioner of Patents and Trademarks*